UNITED STATES PATENT OFFICE.

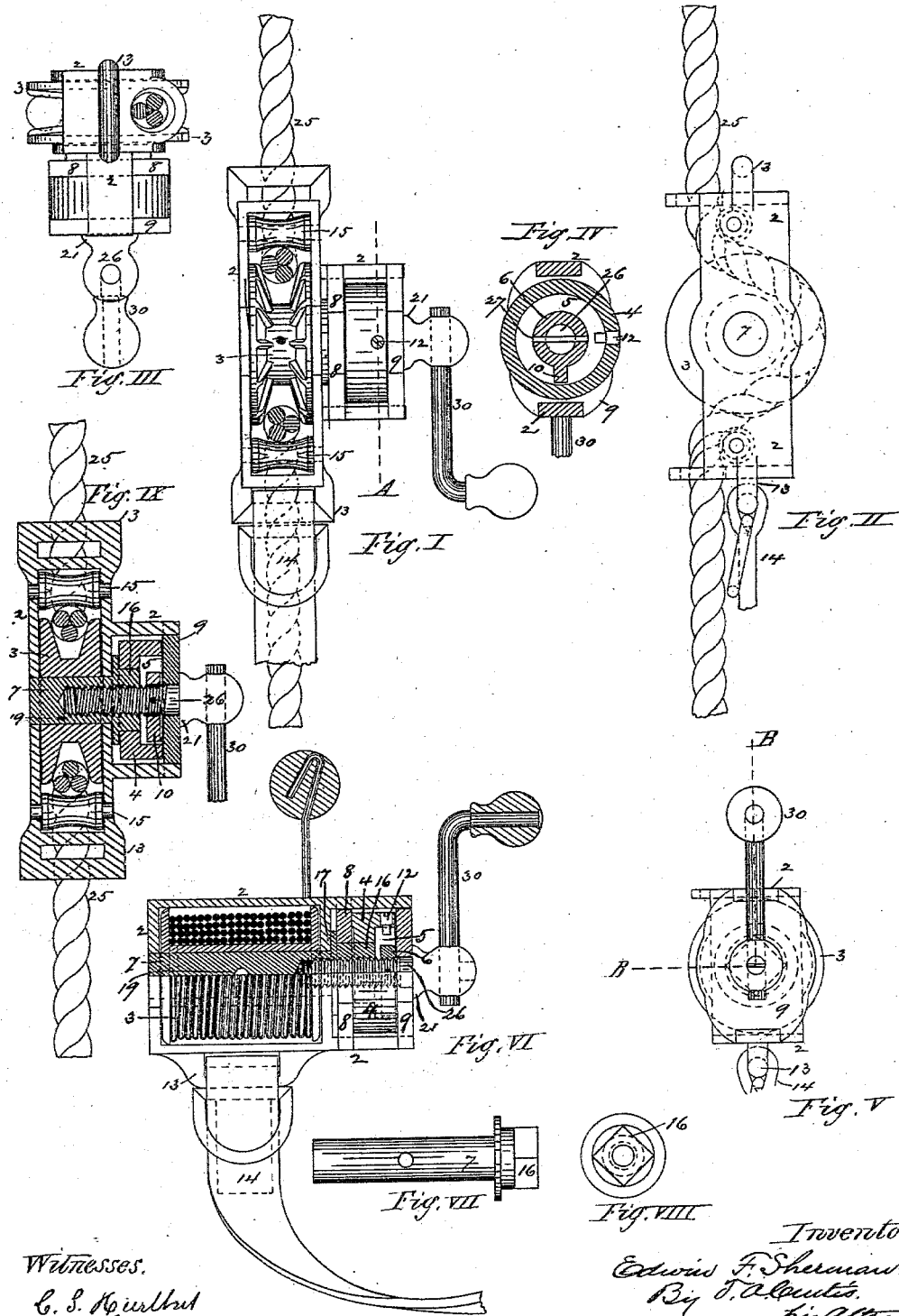

EDWIN F. SHERMAN, OF SPRINGFIELD, MASSACHUSETTS.

FIRE-ESCAPE.

SPECIFICATION forming part of Letters Patent No. 296,298, dated April 1, 1884.

Application filed August 22, 1883. (No model.)

*To all whom it may concern:*

Be it known that I, EDWIN F. SHERMAN, of Springfield, in the county of Hampden and State of Massachusetts, have invented a new and useful Improvement in Fire-Escapes, of which the following is a specification.

The object of my invention is to provide a simple, strong, and effective fire-escape or device for descending from a height by a rope or cord, and for lowering heavy weights; and I accomplish this by the mechanism substantially as hereinafter described, and illustrated in the accompanying drawings, in which—

Figure I is a front view of my invention. Fig. II is a side view of the same. Fig. III is a plan view of the same. Fig. IV is a transverse vertical section of the same at line A of Fig. I. Fig. V is a side view of a modification of the invention. Fig. VI is a half front view and half section of the same at line B of Fig. V. Fig. VII is a side view of the spool bearing or shaft. Fig. VIII is an end view of the same, and Fig. IX is a modification showing a single friction-plate.

In the drawings, 2 represents a frame of suitable metal, in which a shaft, 7, is arranged to revolve in bearings at each end, and upon this shaft I secure, preferably by a pin, 19, a spool, 3, which for certain purposes I make somewhat short and with a ribbed flange at each end, as shown at Fig. I, so that a suspended rope or cord, as 25, may extend around this spool, fill the space between the flanges, and be held in contact therewith by friction-bearings, as 15, one above and one below the said spool, as shown in Fig. I and in dotted lines in Fig. II.

The shaft 7, which merely serves the purpose of a hub for the spool, has a threaded hole made longitudinally in the end to receive, preferably, a left-hand screw, 26, provided with a flange, 21, near its outer end, and a winch, 30, by which to turn it. In the modification shown in all the figures except Fig. IX, a friction-plate, 8, is fitted upon the shaft 7, so that the latter may turn freely therein, and is so secured to the frame that the plate may not revolve with the shaft or spool; and I prefer that this plate may have a slight movement in the frame in the direction of the shaft and the screw; and a friction-disk, 4, is firmly secured to the shaft 7, preferably by making the extreme end of the shaft prismatic or four-sided, as at 16, and making a corresponding hole through or in said disk 4, and placing the latter thereon. When two friction-plates, 8 and 9, are used, this disk 4 may be adapted to have a slight movement in the direction of the length of the shaft, and one side of this disk is counterbored out or recessed, as shown at 5 in Fig. VI, and a collar, 6, provided with a projecting lug, 10, is fitted to and secured upon the screw, either by a pin, 27, as shown in Fig. IV, or otherwise, with a plate, 9, placed on the screw between said collar 6 and the flange 21 on the outer end of the screw, in which plate said screw is free to turn, said plate being secured fast to the frame 2, when in place, but so as to be moved slightly in a direction toward and from the disk 4.

A screw or pin, 12, is secured in the disk 4, with its inner end projecting into the recess 5, as shown clearly in Fig. VI, so that the projecting lug 10 may strike against said screw or pin and prevent the screw 26 from turning out of the spool.

As before mentioned, the spool may be made short, so that a single rope may fill the whole space between the flanges, as shown in Figs. I, II, and III, in which case the rope used, as 25, may be secured at its upper end, and a person using it may secure himself to the device by a harness or strap, a portion of which is shown at 14, secured in a loop, 13, made on the frame 2 at either end.

If the upper end of the rope be secured firmly to any fixed or stationary object in the upper room of a high building, and the rope 25 be then suspended therefrom to the ground, with the device at the upper part of the rope, and the person secured to it by the harness or strap 14, he may throw himself out of the window, and his weight will tend to cause the device to move down the rope, which will cause the spool and its shaft to revolve and turn the shaft 7 onto the screw 26.

Of course, as the plate 8, disk 4, and plate 9 are placed close together, but very little rotary movement of the spool and its shaft could take place, as the movement instantly turns the spool onto the screw far enough to draw the plate 8, disk 4, and plate 9 snugly and firmly together, and prevents the disk 4, which is made fast to the shaft 7, from revolving by the friction of the plates 8 and 9 against the sides of the disk, and the device and the person secured thereto cannot descend; but if the person turn the winch 30, which is within easy reach, he will thereby turn the screw out of the spool or its shaft and release the disk from the pressure and friction of the plates 8 and 9 against its sides, and the spool being then free to turn, as long as the person turns the winch and screw the device and the person secured thereto will descend. The person may easily control the speed of his downward movement, inasmuch as he will descend more or less rapidly as he turns the winch and screw more or less rapidly.

The device shown in Figs. I, II, and III is designed to be permanently secured in any place—as, for example, in the upper room in a building and conveniently near a window—and if the distance to the ground be great and there are several persons to go down, one of them may use it to descend and the rope be then drawn up, the device run back along the rope to its former place of starting, and another person descend, and so on.

It is evident that if the frame be fixed in any stationary position any heavy weight may be attached to the end of the rope, and a person standing near may turn the winch, and the weight suspended on the rope will pull the latter through the machine more or less rapidly, according as the winch is turned more or less rapidly, so that it will be seen that the device may be advantageously used for mechanical purposes for lowering or controlling the lowering of heavy weights, as well as for a permanent fire-escape.

For portable purposes, as being convenient for a person traveling to carry in a hand-bag or otherwise, I prefer the modification shown in Figs. V and VI, in which the spool 3 is made longer upon which to wind or coil a small wire cord, 35, and when wanted for use the free end of the cord is fastened securely to any fixed or stationary object and the device secured to the person as before by the strap or harness 14, and the person may descend more or less rapidly by turning the winch faster or slower. Inasmuch as the friction is abundant to sustain very heavy bodies or weights, any number of persons which the cord is sufficiently strong to sustain may descend at once by securing themselves to the frame 2 by the straps or harness 14 or other suitable means. Any one may with perfect safety descend from any height, however great, provided the rope or cord is sufficiently long; and however inexperienced a person may be, he may easily and safely descend by the simple effort of turning the winch, and when suspended will not and cannot descend without turning it.

It is evident that the spool 3 and its shaft 7 might be made in one and the same piece or solid by slightly changing the form of the frame; but I make them separate or in two parts for convenience of placing them in position in the frame 2 as I have constructed the latter.

In Fig. IX is shown a modification of the device in which only a single friction-plate, 9, is used, which, being secured in the frame 2, with a slight movement toward and from the disk, and the latter being firmly secured to the shaft, or to the revolving bearings of the spool, the disk will always revolve with the spool. When the spool is turned in a direction to be turned onto the screw 26, the plate 9 is thereby clamped firmly against the side of the disk, and the latter and the spool to which it is connected or secured cannot revolve until the pressure of the plate 9 against the disk 4 is released by turning the winch, as before.

Although this device made with a single friction-plate, 9, might be sufficiently strong and safe for all practical purposes, yet I prefer to use the two friction-plates 8 and 9, as I obtain double the amount of friction obtained by the use of a single plate, while the winch is turned very much easier with two than with one.

I use a left-hand screw, 26, only for the reason that it is more natural to turn the winch in the direction required, or "from" the person who is operating it in turning the screw out of the spool or its shaft than in the other direction; otherwise an ordinary right-hand screw and a corresponding threaded hole in the shaft would answer just as well.

It is not necessary to the successful operation of the device that the plate 8 should be secured in the frame so as to have a slight movement in the direction of the length of the spool or its screw, inasmuch as the plate 9, moving against the disk 4 and moving the latter against the plate 8, would clamp the disk firmly between the plates 8 and 9, and would stop the rotation of the spool and disk secured thereto.

Having thus described my invention, what I claim as new is—

1. The combination, with a frame, of a shaft having a spool secured thereto or made thereon, adapted to receive a rope or cord and to revolve in bearings in said frame, a recessed disk secured to said shaft or spool to revolve therewith, a screw adapted to be turned in a threaded hole in said shaft or spool, and provided with a projecting lug to impinge against a projection or pin in said disk, and a movable plate secured in said frame, and adapted to be forced against said disk by said screw to stop the rotation of the spool and disk when the spool is turned onto said screw, and to release the disk and spool and permit their rotation when the screw is turned out of the spool, substantially as described.

2. The combination, with a frame, of a shaft having a spool secured thereto or made thereon, adapted to receive a rope or cord and to revolve in bearings in said frame, a recessed disk secured to said shaft or spool to revolve therewith, a screw adapted to be turned in a threaded hole in said shaft or spool, and provided with a projecting lug to impinge against a projection or pin in said disk, and two plates, one movable and secured in said frame, and adapted with a movement to clamp said disk between them when the spool is turned onto said screw, and to release the disk and spool and permit their rotation when the screw is turned out of the spool, substantially as described.

EDWIN J. SHERMAN.

Witnesses:
T. A. CURTIS,
C. G. BUTTRICK.